United States Patent Office 3,072,712
Patented Jan. 8, 1963

3,072,712
MONO ESTERS AND AMIDES OF DI LOWER ALKYL MALONIC ACID WITH 2-CARBOXY-2 DI LOWER ALKYL ETHYL ALCOHOL AND AMINE AND PREPARATION THEREOF
John R. Caldwell, Kingsport, Tenn., assignor to Eastman Kodak Company, Rochester, N.Y., a corporation of New Jersey
No Drawing. Original application Aug. 22, 1957, Ser. No. 679,775, now Patent No. 3,003,888, dated Oct. 10, 1961. Divided and this application Dec. 5, 1960, Ser. No. 81,912
4 Claims. (Cl. 260—485)

This invention relates to new dicarboxylic acids and to their use as plasticizers.

This application is a division of my copending application Serial No. 679,775, filed August 22, 1957, and now Patent 3,003,888.

Various materials have been suggested as plasticizers for polymeric compositions in order to make these materials flexible under various circumstances. However, many of these plasticizers have defects such as being easily leached out by solvents such as water or the like. Others exude from the polymeric material due to the fact that are incompatible with the polymeric substance or due to their instability during temperature variations. Others turn yellow under the influence of sunlight or oxidation or result in other colors occurring in the polymeric material after a period of time has elapsed. Still others result in a sticky surface on the plastic material due to the large amount of the plasticizer which is necessary to plasticize the polymeric material or due to the exuding of the polymer to the surface of the polymeric material.

I have found surprisingly that certain new dicarboxylic acids having the neopentyl structure and their esters are valuable as plasticizers, synthetic lubricants and polymer intermediates. These materials have excellent resistance to hydrolysis, are compatible with cellulose esters, cellulose ethers, and vinyl chloride polymers and are resistant to thermal degradation, being able to withstand temperatures as high as 150° for 12 hours with a low loss.

One object of this invention is to provide new dicarboxylic acids that contain a neopentyl structure. Another object of the invention is to provide a plasticizer which is compatible with cellulose esters, cellulose ethers, and vinyl chloride polymers. A further object is to provide a method of plasticizing polymeric materials with a plasticizer which is resistant to hydrolysis, and which has resistance to thermal decomposition.

In the practice of my invention, compounds that contain two neopentyl hydroxyl groups and an ester or amide group are oxidized using strong nitric acid. Surprisingly the ester and amide groups remain intact during the oxidation process wherein it would be expected that these groups would be hydrolyzed. The new acids of my invention contain both carboxyl groups on neopentyl carbon atoms.

Esters having an exceptionally high resistance to hydrolysis can be made by employing alcohols or glycols that contain a neopentyl structure, such as 2,2-dimethylpentanol, cyclohexane methanol and bicycloheptanedimethanol.

The following illustrates my invention.

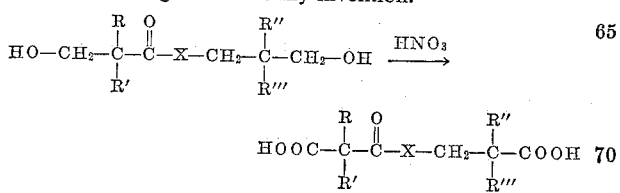

R, R', R", and R''' are alkyl radicals containing from 1 to 6 carbon atoms. They may be the same or different radicals. X is O or

where M is H, alkyl, or aryl.

Nitric acid is the preferred oxidizing agent but others may be used as represented by nitric oxide, chromium trioxide, potassium permanganate, hydrogen peroxide and oxygen plus a metal catalyst.

The acids can be esterified with alcohols and glycols by the usual methods, employing acid catalysts and azeotroping agents such as benzene or toluene. The acids can be converted to the anhydrides and acid chlorides by the usual methods. The acid chlorides may be employed in the preparation of esters, amides and polymers. The acids are useful as components of linear polyesters, and polyamides. They also are useful in the manufacture of polyurethanes.

The following examples illustrate my invention but are not intended to limit it in any way:

Example 1

1,3-propanediol, 2,2-dimethylmono (2,2-dimethylhydracrylate) was prepared by heating hydroxypivaldehyde in the presence of an alkaline catalyst. The diol contains an ester group and has the structure

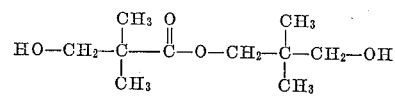

An oxidizing solution was prepared by adding 0.15 gram sodium nitrite and 20.4 ml. water to 99.6 ml. concentrated (70 percent) nitric acid. The solution was stirred at 33° C. and 0.5 gram of the diol was added. The temperature rose to 40°, showing that the reaction had started. The diol (30 grams) was then added in small portions over a period of 1 hour, while the temperature was held in the range of 35–40° C. After the diol had been added, the mixture was stirred for 1 hour longer. The solution was then cooled to 5° C. and filtered. The product was washed with ice water. The yield was 20–22 grams of acid melting at 98–102° C. Another 8–10 grams of acid was obtained by saturating the filtrate with sodium sulfate. This process gave a yield of 70–80 percent malonic acid, dimethylmono (2-carboxy-2-methylpropyl) ester having the structure

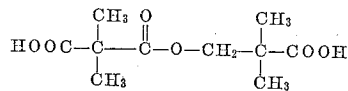

titration gave an equivalent weight of 118 (theoretical 116). The acid is soluble in the lower alcohols and somewhat soluble in water.

Example 2

One part of the acid prepared in Example 1, three parts of 2-ethylbutanol, 0.1 part toluene sulfonic acid, and two parts of toluene were heated in a vessel equipped with a distillation column and a continuous decanter for the removal of water. The ester was isolated by distillation.

The esters of 2,2-dimethylpentanol, 2-ethylhexanol, and cyclohexanemethanol were prepared in a similar manner. These esters are valuable as plasticizers, synthetic lubricants, and hydraulic fluids.

(A) The 2,2-dimethylpentanol ester was compatible with cellulose esters, cellulose ethers, and vinyl chloride polymers. One part of the ester and two parts of cellulose acetate butyrate were dissolved in 10 parts of ethylene dichloride and a film was cast from the solution. The film was clear and flexible. Similar results were obtained when a copolymer of 85 percent vinyl chloride-15 percent vinyl acetate was used in place of the cellulose acetate butyrate.

The 2,2-dimethylpentanol ester was tested for stability as a lubricant under severe conditions. The compound showed substantially no decomposition when heated in air at 150° C. for 12 hours.

(B) The 2-ethylhexanol ester was compatible with cellulose esters, cellulose ethers, and vinyl chloride polymers. One part of the ester and two parts of cellulose propionate were milled on the hot rolls. The product was injected-molded to give clear, tough moldings.

This ester is of particular value as a hydraulic fluid in systems that are subject to relatively high temperatures because it showed substantially no change when in contact with air and steam at 100–110° C. for 10 days.

The cyclohexanemethanol ester was found to be of particular value as a lubricant for severe conditions of heat and exposure to air. It showed substantially no degradation when exposed to air at 180–200° C. for 48 hours.

The esters showed less than 0.3 percent hydrolysis after 96 hours in boiling water when used as plasticizers. Under these conditions, esters of adipic, sebacic, and other straight-chain aliphatic acids show from 5–10 percent or more hydrolysis.

*Example 3*

A polymeric plasticizer was made by heating 1 molecular proportion of the acid with 1.2 molecular proportions of diethylene glycol. The polymer could be terminated by heating with a monocarboxylic acid or anhydride. When terminated with 2-ethylbutyric acid, the polymeric plasticizer was compatible with cellulose esters, cellulose ethers, and vinyl chloride polymers. One part of the plasticizer and three parts of a copolymer of 86 percent vinyl chloride-14 percent diethylmaleate were dissolved in 10 parts of tetrahydrofuran and a film was cast. The film was clear and flexible. It showed a loss in weight of only 0.2 percent when immersed in water for 48 hours.

*Example 4*

A polymeric plasticizer was made by heating 1 molecular proportion of the acid, 0.8 molecular proportion of ethylene glycol and excess butyl alcohol. The excess butyl alcohol was removed under vacuum and the product was obtained as a syrup. The plasticizer showed only 0.3% hydrolysis in boiling water after 96 hours. It was compatible with cellulose esters, cellulose ethers, and vinyl chloride polymers. Cellulose acetate films containing 30 percent of the polymeric plasticizer were clear and flexible. They showed only 0.2 percent loss in weight when heated at 100° C. for 24 hours.

*Example 5*

A linear polyester was made by heating the acid with excess 2,2-dimethylpropanediol, using titanium butoxide catalyst, and employing the usual polyesterification process. The polyester softened at 130–145° C. It was soluble in tetrachlorethane and gave strong, flexible films when cast from the solution. The polymer is particularly useful as an ingredient of protective coatings because it showed no hydrolysis when boiled in water for 96 hours.

*Example 6*

One molecular proportion of hydroxypivalic acid and one molecular proportion of 2,2-dimethyl-3-aminopropanol were heated at 200–220° C. for 3 hours to give the amide:

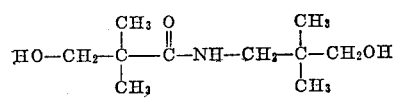

The amide was oxidized with nitric acid as described in Example 1 to give the acid:

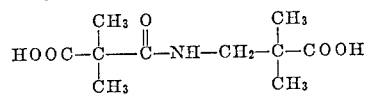

The acid was heated with an equivalent amount of hexamethylene diamine in cresol for 3 hours at 210–215° C. The resulting polyamide was isolated by pouring the cresol solution into acetone and filtering off the precipitate. The polyamide softened at 170–180° C. It was particularly useful as a molding plastic.

Using the method described above, a polyamide was made by heating the acid with an equivalent amount of 1,4-cyclohexane bis (methylamine). It softened in the range of 225–240° C. and was valuable for the manufacture of fibers, films and molded objects.

In the formulas for our plasticizers as folows:

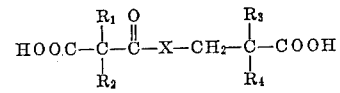

$R_1$, $R_2$, $R_3$ and $R_4$ are selected from the class consisting of alkyl radicals having 1–6 carbon atoms and X is selected from the class consisting of —O—, NH, N-alkyl and N-aryl. N-alkyl is intended to represent a group in which the alkyl group has 1–6 carbon atoms and N-aryl represents an aryl group having 6 carbon atoms.

I claim:

1. A new composition of matter having the following formula:

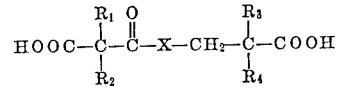

in which $R_1$, $R_2$, $R_3$ and $R_4$ are alkyl radicals having 1–3 carbon atoms and X is selected from the class consisting of O and NH.

2. A process for obtaining a carboxylic acid containing a neo-pentyl structure comprising oxidizing an alcohol having the following structural formula:

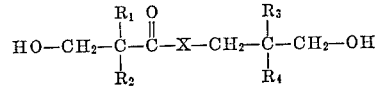

with nitric acid to obtain a composition of matter having the following structure:

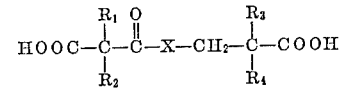

in which $R_1$, $R_2$, $R_3$, and $R_4$ are alkyl radicals having 1–3 carbon atoms, and X is selected from the class consisting of O and NH.

3. A new composition of matter, a malonic acid, di-methyl-, mono(2-carboxy-2-methylpropyl) ester having the following structure:

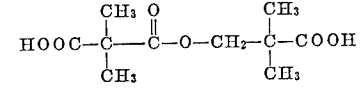

4.

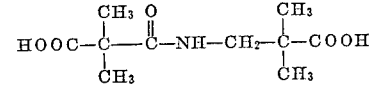

References Cited in the file of this patent

UNITED STATES PATENTS

| 2,658,055 | Alderson | Nov. 3, 1953 |
| 2,719,172 | Nebe et al. | Sept. 27, 1955 |
| 2,811,562 | Hagemeyer | Oct. 29, 1957 |